(No Model.) 8 Sheets—Sheet 1.

P. KÄMMERER.
MACHINE FOR LOADING CARTRIDGES.

No. 553,245. Patented Jan. 21, 1896.

Fig. 1

Witnesses. Inventor.

(No Model.) 8 Sheets—Sheet 3.

P. KÄMMERER.
MACHINE FOR LOADING CARTRIDGES.

No. 553,245. Patented Jan. 21, 1896.

Fig. 3

Witnesses:

Inventor.
P. Kämmerer
By W. E. Haddan
Attorney.

(No Model.)  
P. KÄMMERER.  
MACHINE FOR LOADING CARTRIDGES.  
No. 553,245.  Patented Jan. 21, 1896.

Witnesses.

Inventor.  
P. Kämmerer  
Attorney.

(No Model.)

P. KÄMMERER.
MACHINE FOR LOADING CARTRIDGES.

No. 553,245.

Patented Jan. 21, 1896.

Witnesses.

Inventor
P. Kämmerer
Attorney (No Model.)

P. KÄMMERER.
MACHINE FOR LOADING CARTRIDGES.

No. 553,245.

Patented Jan. 21, 1896.

Witnesses.

Inventor.
P. Kämmerer
Attorney.

United States Patent Office.

PAUL KÄMMERER, OF TROISDORF, GERMANY.

MACHINE FOR LOADING CARTRIDGES.

SPECIFICATION forming part of Letters Patent No. 553,245, dated January 21, 1896.

Application filed November 13, 1894. Serial No. 528,692. (No model.)

*To all whom it may concern:*

Be it known that I, PAUL KÄMMERER, a subject of the Emperor of Germany, and a resident of Troisdorf, near Cologne, in the Empire of Germany, have invented certain new and useful Improvements in Cartridge-Filling Machines, of which the following is a specification.

This invention relates to a cartridge-filling machine intended to portion off certain quantities of powder, to weigh every portioned-off quantity, and to so adjust the receptacle serving to pass off the weighed portions of powder that the quantities of powder exactly corresponding to a certain weight are forwarded to the cartridge-case, while those quantities which either surpass this desired weight or do not reach it are turned aside from the cartridge-cases successively supplied to be filled.

In the annexed drawings.

Figure 3:
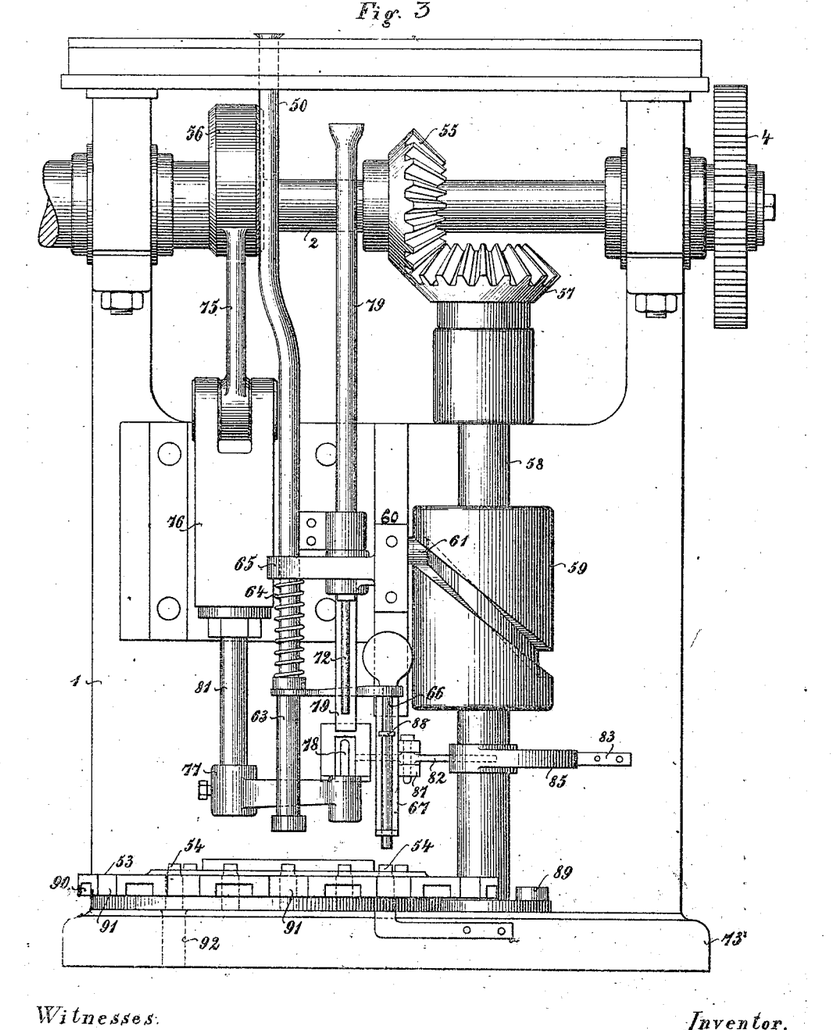
Figs. 3 and 4 represent the lower part thereof, also in front and side elevation, respectively.
Figure 4:
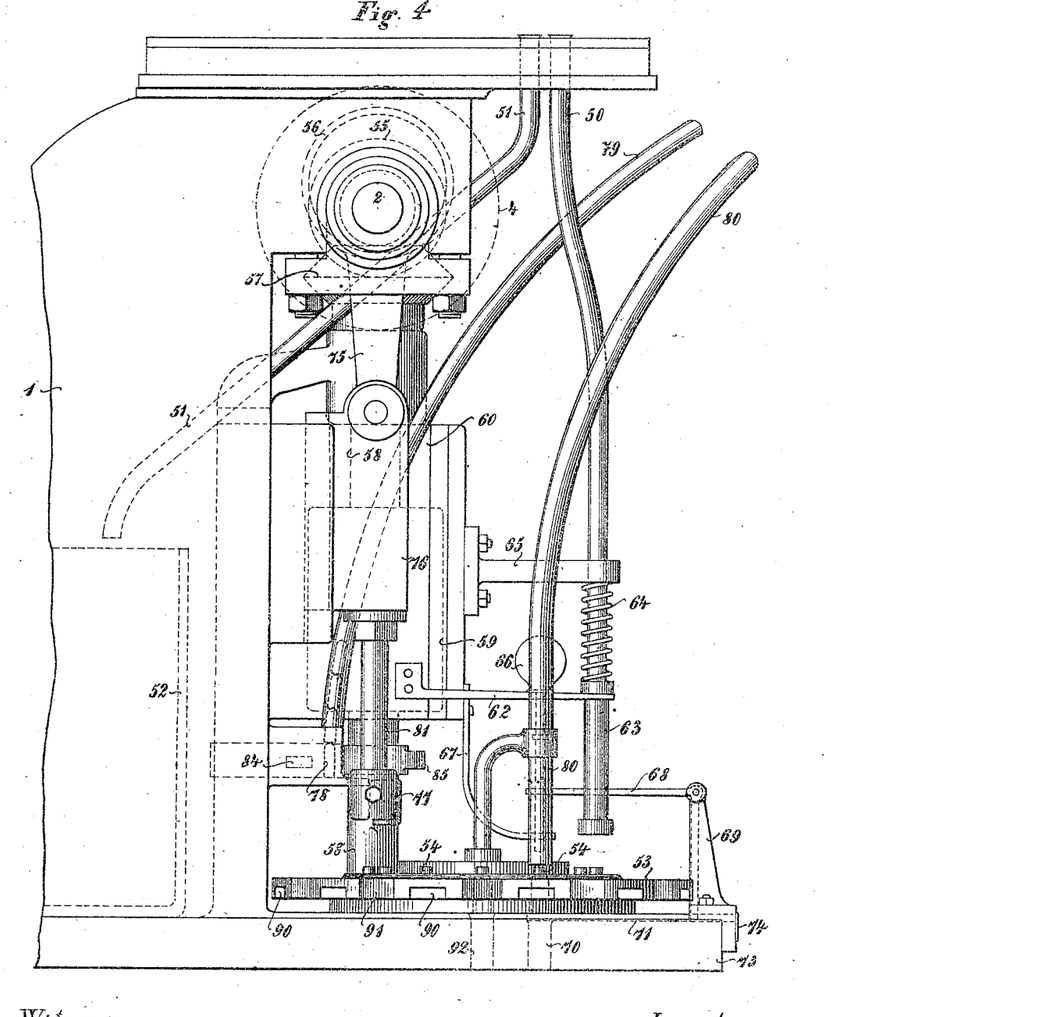
Figure 11:
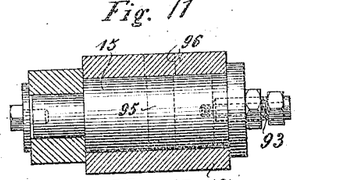
Figure 12:
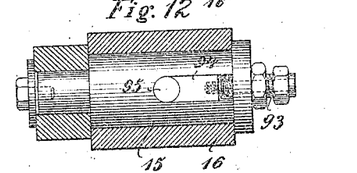
Figure 13:
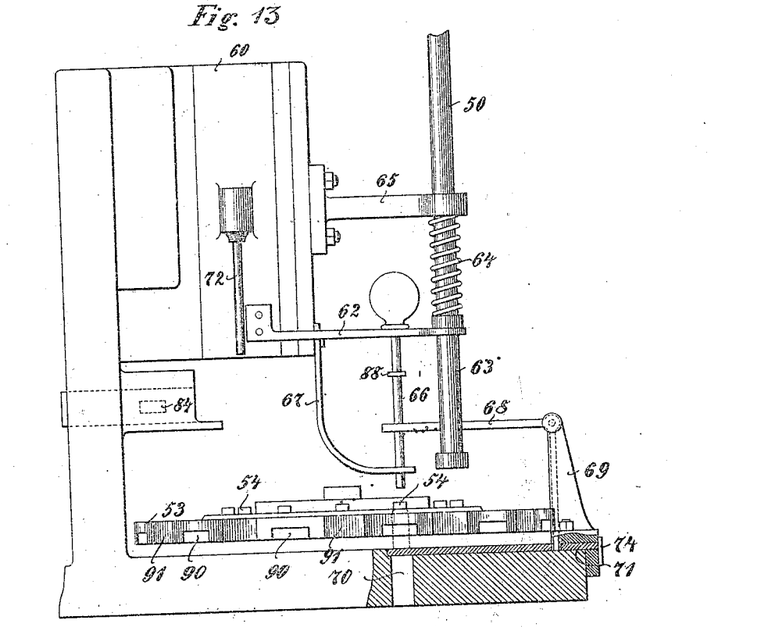

In the frame 1 of the machine, Figs. 3 and 4, is journaled the shaft 2, which is driven by the belt-pulley 3, keyed on said shaft at its left-hand side. On the opposite end of the driving-shaft 3 a spur-wheel 4 is provided, which engages with the spur-wheel 5 on the shaft 6. The shaft 6 is journaled in the plumber-blocks 7 and in the lower part of the pillar 8, and it carries at its opposite end a cam or tappet 9, on which runs a wheel 10 on the lower end of a thrust-rod 11. The upper end of this thrust-rod 11 is pivoted on the lever 12 of the plug 15 of a cock arranged inside the casing 16 at the head of the pillar 8. The spring 14 connecting the lever 12 to the bed-plate 13 tends to draw down said lever. The plug 15, Figs. 11 and 12, is furnished with a bore 95, which, by means of the slide-piece 94, adjustable by means of the screw 93, can be made to have a larger or smaller cross-sectional area. The housing 16 is provided with two bores, 96 and 97. The casing 16 carries the funnel 17 in communication with the bore 96. This funnel is intended to receive the powder to be portioned off, while the lower bore, 97, ends in a discharge-nozzle 18. The latter lies above the flaring end of tube 19, and the lower termination of this latter tube lies immediately over the weighing-funnel 20.

Figure 1:
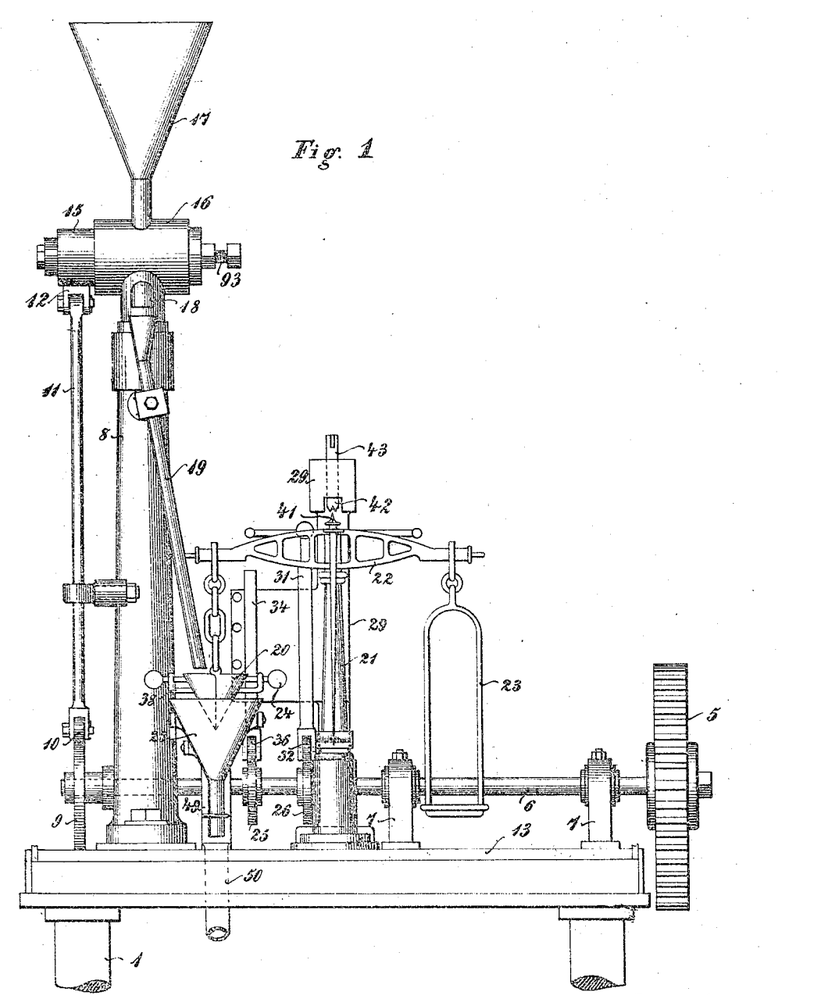
Figures 1 and 2 represent the upper part of the machine in front and side elevation, respectively.
Figure 2:
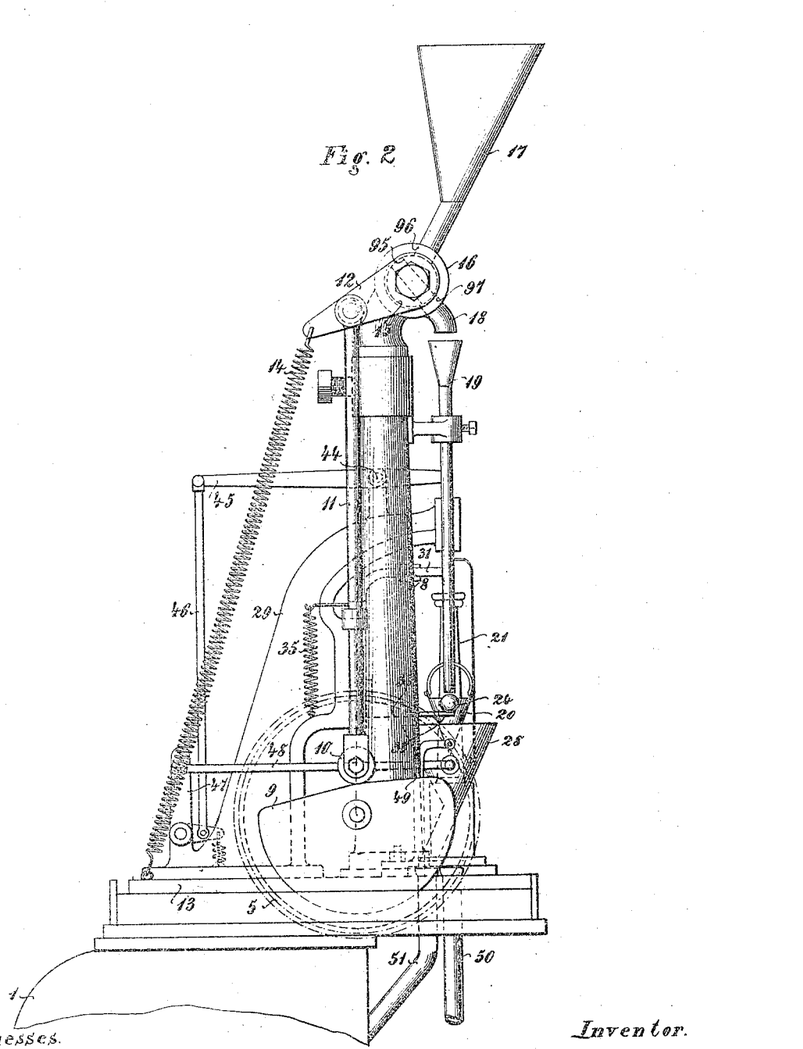
Figure 10:
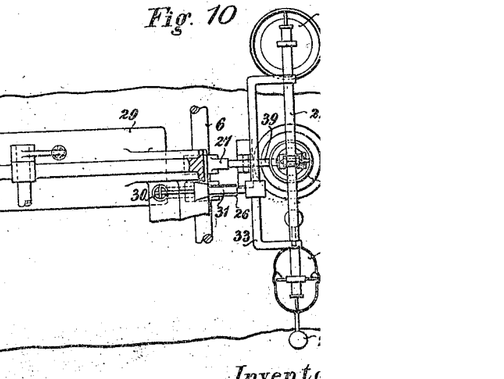

The weighing-funnel 20 is suspended from the one arm of the balance-beam 22 carried by the column 21, while the other arm of the balance-beam carries an ordinary scale-pan 23. The weighing-funnel 20 is in the form of an inverted cone, and consists of two portions divided upon a central plane passing through the apex of the cone. These two portions are suitably hinged together and held in contact by the weighted arms 24, Figs. 1, 2, and 10. Upon the shaft 6 there are also three small cams, 25, 26, and 27, Figs. 7 to 10. On the cam 25 runs the wheel 36 of the slide-rod 34, guided in the bracket 29. The spring 35, attached to said rod 34 and to the bracket, holds the wheel 36 in contact with the cam 25.

The arm 37 on the slide 34 carries a fork 38, of which the two prongs respectively support the weighted arms 24 of the weighing-funnel 20, and on lifting and lowering of the slide 34, caused by the rotation of the cam 25, alternately opens and closes the weighing-funnel 20.

The cam 26 co-operates with the wheel 32 on the stop-slide 31, likewise carried by the bracket 29 and connected thereto by the spring 30 to keep the wheel and cam in close contact. On the rotation of the cam-disk 26 the balance-beam 22 is alternately arrested and freed by or from the arms 33 of the slide 31. Against the cam 27 rests the free arm of a double-armed lever 39, fulcrumed behind the column 21, while the other arm of said lever is pivotally connected with a rod 40, which is guided in the column 21 and rests with its upper end against the balance-beam 22, so that the rod 40 and with it the balance-beam 22 on rotation of the cam 27 are alternately lifted and lowered.

Upon the center of the upper balance-beam 22 a knife-edge 41 is arranged, opposite to which a double knife-edge 42 is provided, which is fixed on the lower end of a rod 43 guided in the upper end of bracket 29. The rod 43 is at its upper end pivoted to a double-armed lever 45, which latter is fulcrumed on the pivot 44 on the bracket 29.

This lever 45, by means of the rod 46, bell-crank lever 47, and rod 48, is connected with the directing-funnel 28.

Figure 5:
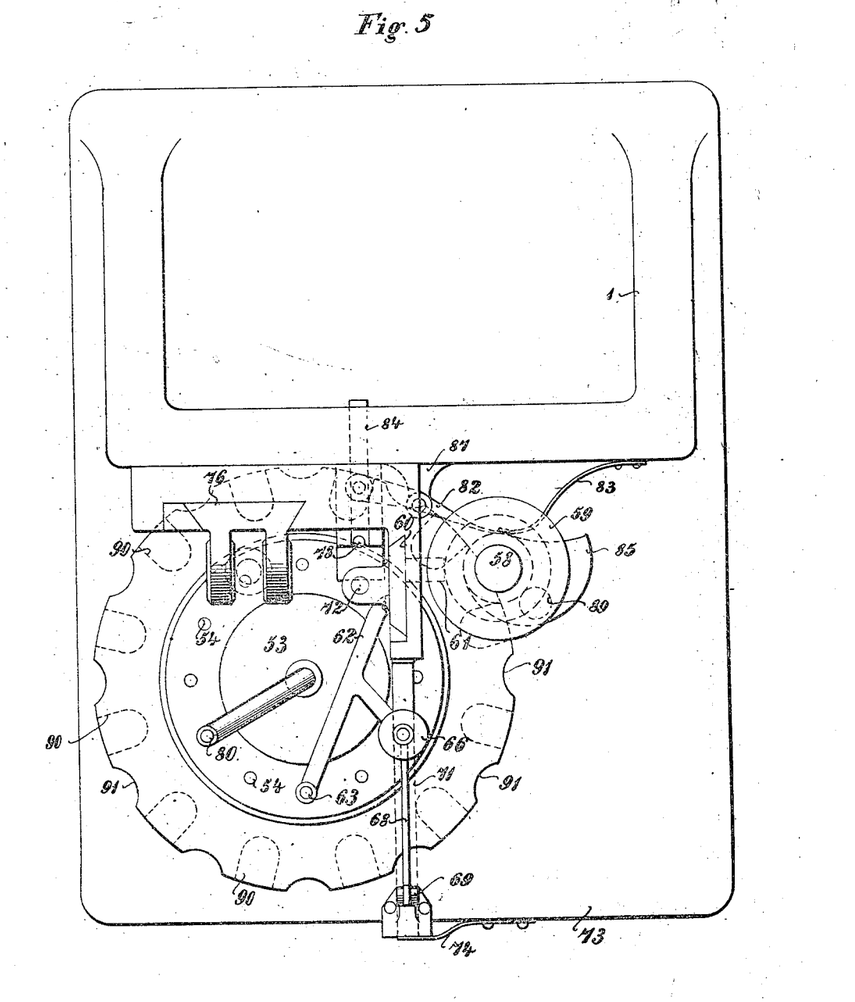
Fig. 5 shows the lower part in plan.
Figure 6:
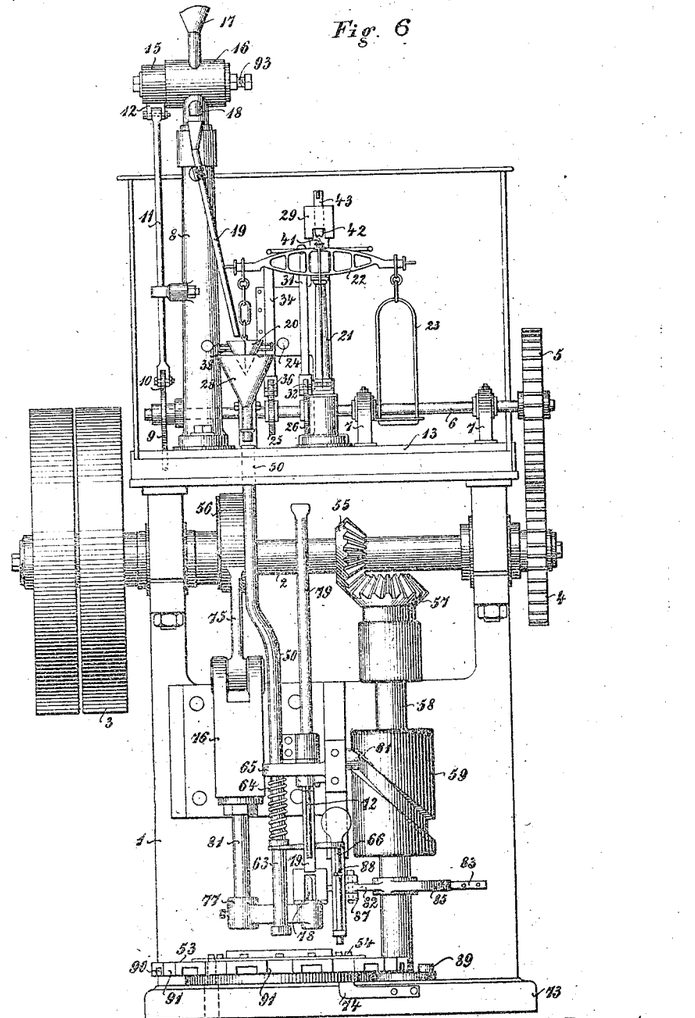
Fig. 6 is a front elevation of the whole machine.
Figure 7:
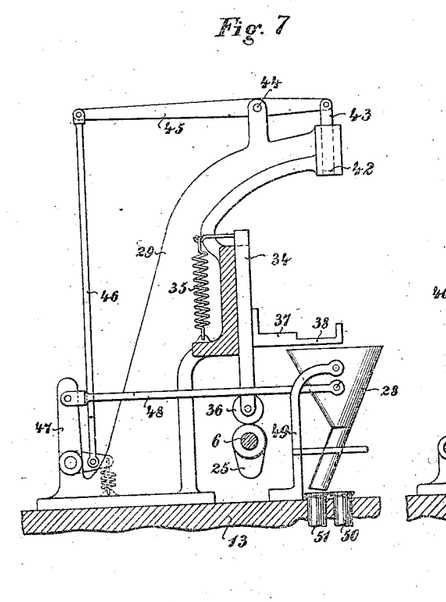
Figs. 7 to 13 are detail views of parts.
Figure 8:
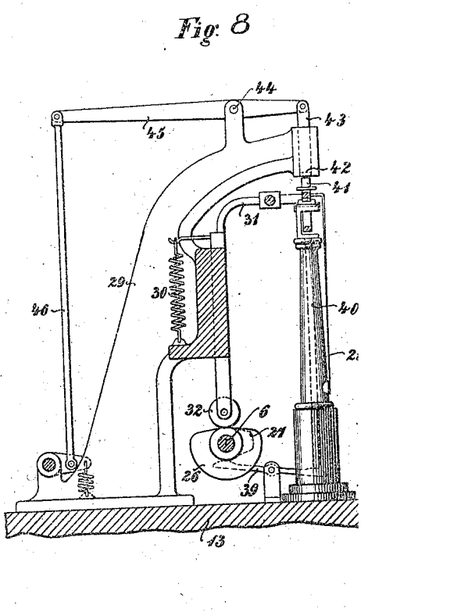
Figure 9:
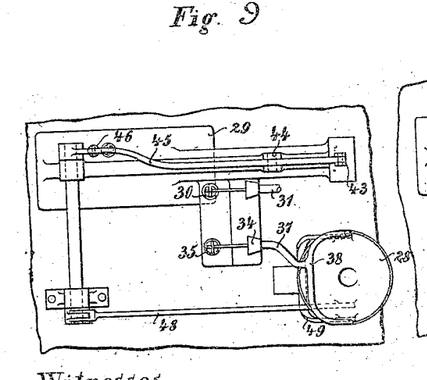

The directing-funnel 25 is rotatably arranged on a forked bracket 49 fixed upon the plate 13, so that its outfall-tube may be brought above the entrance of either the two pipes 50 and 51, of which the latter 51 leads toward a receiver 52 and the former tube 50 toward the cartridge-case 54 thereunder inserted and presenting itself thereto in a revolving disk 53, Figs. 3, 4, and 5.

The lower operative parts of the machine are set in action from the shaft 2 through beveled gears 55 and 57 and the eccentric 56. The beveled-tooth wheel 55 engages with the beveled-tooth wheel 57 on the end of the vertical shaft 58. The shaft 58 carries a cam 59 having an inclined groove in which runs a wheel 61 upon the slide 60, Figs. 3 and 4. Below the wheel 61 a fork 62 is fixed on the slide 60, one arm of which carries a tubular sleeve 63 sliding upon the lower end of the powder-conveying tube 50. The tubular piece 63 stands under the action of the spring 64, which latter rests against the rigid arm 65. In the other arm of the fork 62 a weighted rod 66 is loosely inserted, the said rod 66 being guided in the rigid bracket 67, and its lower end on the downward movement of the slide 60 penetrates into that cartridge-case 54 immediately beneath it in the revolving disk 53.

68 is a bell-crank lever pivotally arranged in the bracket 69 placed sidewise of the revolving disk 53. The lower arm of said angular lever is in connection with a slide 71 lying beneath the disk 53 and covering an opening 70 in the bed-plate. Against the slide 71 rests a spring 74 fixed on the base-plate 73 of the machine. On the slide 60, further, the stamp 72 is also fixed, Fig. 3, which presses the projectiles onto the charged cartridge-cases. The ring encircling the eccentric 56 is connected by rod 75 with the slide 76 and moves the latter up and down together with the rod 81 connected therewith. The rod 81 carries an arm 77, which is annular at its outer end.

The projectiles are supplied to the machine through the tube 79, while the cartridge-cases arrive through the supply-tube 80 into the concentrically-arranged orifices of the revolving disk 53.

The double-armed lever 82, arranged in the bracket 87 of the machine-frame, is actuated by the spring 83 and is pivotally connected with the slide 84. On revolution of the shaft 58 the cam 85, which rests against the lever 82, rocks the latter and effects an alternate forward and backward sliding movement of the slide 84, so that the front end of said slide embraces one of the projectiles 78 fed through the tube 79. The disk 53 is revolved by the shaft 58 through the action of the crank-pin 89, which at each revolution engages in one of the holes 90 on the under side of the disk 53 and periodically turns the disk to a certain extent. The locking of the disk 53 after each partial revolution is effected by the shaft 58 placing a solid portion of its periphery into one of the recesses 91, which are arranged at certain intervals around the periphery of the disk 53, whereas the unlocking is effected by a slot in said shaft arriving during revolution of the shaft in such a position that the edge of disk 53 can pass through it.

The operation of the above-described machine is as follows: Owing to the rotary motion imparted to the shaft 6 from the shaft 2 through the spur-wheels 4 and 5, the cam 9 causes the bar 11 and the lever 12 connected therewith to be alternately lifted and lowered, so that the cock 15 is at certain intervals turned backward and forward to a certain extent. When the lever 12 has arrived at its highest position, the cock 15 receives a quantity of powder corresponding to the adjusted size of its inner bore and delivers this quantity on backward rotation of the cock 15 when the lever 12 has reached its lowest position, Figs. 1 and 2, to the nozzle 18. The portion of powder falls through the tube 19 into the weighing-funnel 20. At this moment the cam 26 begins to act by lifting the arms 33 of the slide 31 away from the scale-beam, thus freeing the latter. The scale-pan 23 will have been provided with the weights necessary to exactly balance the portioned-off quantity of powder. The balance-beam 22 now, when the weight of the quantity of powder in the weighing-funnel 20 corresponds exactly to the weights placed upon the pan 23, adjusts itself in such a manner that on lifting of the balance-beam the knife-edge 41 exactly strikes the notch of the double knife-edge 42, knocking this latter upward. When, however, the quantity of powder in the weighing-funnel 20 is of an under or over weight, the knife-edge 41, on raising of the balance-beam 22, passes by to the left or right of the double knife-edge 42 and causes no movement of the same. As soon as the balance has adjusted itself the cam 27 commences its action and lifts up the balance-beam 22, together with the knife-edge 41, by means of the lever 39 and the rod 40. If now the knife-edge 41 hits the notch of the double knife-edge 42, then this latter is likewise lifted, and through the lever 45, the rod 46, the lever 47 and the rod 48 causes a turning motion of the funnel 28, so that the discharge-tube of the latter arrives above the tube 50. If, on the contrary, the knife-edge 41, during the upward movement of the balance-beam 22, passes by to the left or the right of the double knife-edge 42, then the position of the funnel 28, which usually presents itself above the pass-off tube 51, is not changed. Shortly after the cam 27 has commenced lifting the balance-beam 22 the cam 25 begins to act, lifts the slide 34 with the fork 37 and raises the weighted arms 24 of the weighing-funnel 20, and thus causes the latter to open and deliver the quantity of powder therein into the funnel 28. If this amount of powder was exactly corresponding to the intended weight, then the funnel 28, as above described, carries the powder into the tube 50, leading the cartridge-cases 54, in the contrary case—that is, if the weight of the powder is not correct it is carried into the tube 51, which leads to the vessel 52. The tube 63, which is moved by the slide 60, passes closely onto the cartridge-case 54 beneath it and causes the whole amount of powder delivered into the tube 50 to arrive in the cartridge-case to be filled. In the same space of time, during which a further quantity of powder is portioned off, weighed and turned out into the funnel 28, the disk 53 continues revolving so far that the next of the empty cartridge-cases is brought beneath the tube 63. The cartridge-case disk periodically rotates in the described manner, but not every cartridge-case receives a powder charge, since any defective quantities of powder—that is to say, those which do not correspond to the intended weights, as above mentioned—are carried off through the tube 51 into the vessel 52. Therefore an arrangement is necessary to discharge the empty cartridge-case from the machine. For this purpose the weighted bar 66, which is moved up and down by the slide 60, on its downstroke penetrates with its lower end into the cartridge-cases 54 as they present themselves beneath it. The collar 88 of the rod 66 loosely inserted into the one arm of the fork 62 is arranged at such a height as to leave untouched the lever 68 whenever the rod 66 passes into a cartridge-case filled with powder and is arrested by the powder therein. If, on the other hand, an empty cartridge-case arrives beneath the rod 66, then the latter, on the downward stroke of the slide 60, penetrates deeper into the case so that the collar 88 touches the free end of the lever 68, turns the latter, and by withdrawal of the slide 71, connected with the lever 68, allows the cartridge-case to drop down into the opening 70. The slide 71 and angular lever 68 are, after the rising of the rod 66, brought back by the spring 74 into their original positions. In this manner only those cartridge-cases charged with the correct, tested quantities are carried on by the disk 53 for further treatment. The charged cases then arrive underneath the stamp 72, likewise moved up and down by the slide 60, and the said stamp forces the projectile on its downstroke in the known manner into the cartridge-cases. The projectiles 78, supplied through the tube 79, arrive at and present themselves before the free suitably-shaped end of the slide 84, which, by means of the lever 82, is alternately pushed forward and backward, and at the moment when a new cartridge-case 54 arrives beneath the stamp 72 pushes forward a projectile till it is beneath the stamp, so that this latter during its downstroke is enabled to press the projectile into the cartridge-case. In this process the arm 77, fixed on the rod 81 of the slide 76 and moved up and down by the eccentric 56, serves with its free annular end as a guide for the projectile. The slide 84 after having executed its forward movement is drawn back by the force of the spring 83 resting against the lever 82 into its initial position. The cartridge-cases thus charged and provided with projectiles drop through the opening 92, arranged in the base-plate 73, into a collecting-vessel.

I claim as my invention—

1. The combination of means for portioning off a predetermined volume of powder, a balance having a pan adapted to receive said volume, means for discharging the receiving pan of said balance, two chutes leading respectively to a cartridge case and to an overflow vessel, a movable directing vessel beneath said pan having an orifice of discharge adapted to align with either of said chutes, and means for placing said directing vessel in operative connection with the balance whereby its position with regard to the chutes is controlled by the weight of the volume of powder with the object specified.

2. The combination with a rotary shaft of a rotary vessel operatively connected with said shaft and adapted to receive, measure, and deliver a predetermined volume of powder, a balance beam, means operatively connected with said shaft adapted to raise said balance beam, a scale pan adapted to receive the volume of powder, means operatively connected with said shaft adapted to discharge said scale-pan, two chutes leading respectively to a cartridge case and to an overflow vessel, a pivoted directing vessel having an orifice of discharge adapted to be aligned with either of said chutes and means for operatively connecting said directing vessel with said balance beam whereby its position with regard to the chutes is controlled by the position of the balance beam with regard to the horizontal plane for the purpose specified.

3. The combination of a balance beam means for raising the same, a scale pan, two chutes, a pivoted vessel beneath said scale-pan having a discharge orifice adapted to align with either chute, and means adapted to be displaced by the lifting of the balance beam controlling the position of the said pivoted vessel with regard to the chutes for the purpose set forth.

4. The combination of a balance beam means for raising the same, a projection on said beam, a scale pan, a chute leading to a position where a cartridge case may be placed, a second chute leading to a position where an overflow vessel may be placed, a pivoted vessel beneath said scale pan having a discharge orifice normally aligned with the second chute, and a movable abutment operatively connected with said pivoted vessel, adapted to be met and moved by the projection aforesaid only when the balance beam maintains its horizontality when raised, whereby said pivoted vessel is moved to align its discharge orifice with the first chute for the purpose set forth.

5. The combination of a bed-plate having an orifice therein, a slide movable to close and disclose said orifice, a lever operatively connected with said slide, a rotary holder having bottomless orifices for reception of cartridge cases above said bed-plate, an arm adapted to be reciprocated to and from said holder, a plunger loosely guided in said arm and adapted to fall into each cartridge case as it is presented thereunder until its movement thereinto is stopped by powder, if any, therein, and a collar on said plunger adapted to rock said lever when no powder is in the cartridge case thereby causing the withdrawal of the slide and the outfall of the empty cartridge case through the said orifice.

In testimony whereof I have signed this specification in the presence of two subscribing witnesses.

PAUL KÄMMERER.

Witnesses:
 BRUNO THIESEN,
 FRITZ SCHRÖDER.